United States Patent Office 2,953,456
Patented Sept. 20, 1960

---

2,953,456

WATER SOLUBLE PROTEIN CONCENTRATE AND METHOD OF PRODUCING THE SAME

Hermann Mohler, Zurich, and Robert Menzi, Geneva, Switzerland, assignors to Cyklus Limited, Arosa, Haus am Untersee, Switzerland No Drawing. Filed Mar. 13, 1959, Ser. No. 799,111

Claims priority, application Switzerland Mar. 14, 1958

31 Claims. (Cl. 99—14)

This invention relates to methods of manufacturing soluble food concentrates and to the products of such methods.

As is well known, water-soluble meat extracts are being used as food to an increasing extent. These have the taste of meat broth and are produced from fresh meat. Such extracts are produced according to the classical method from meat cut into small pieces, and water. The disadvantage of this known method is that only a very small part of the used meat can be made soluble. The yield is only 1% to 3.5% by weight so that the cost of production is high.

According to the present invention, a method of producing a soluble food concentrate, having the taste of meat broth, includes the steps of obtaining an aqueous extract from an animal or vegetable protein and either subjecting the residue to acid hydrolysis or subjecting a different quantum of protein to acid hydrolysis, adding the hydrolysate so obtained to the aqueous extract, and drying, or partially drying, the ingredients either before or after mixing so as to obtain a water-soluble concentrate. The protein from which the aqueous extract is obtained may be either animal or vegetable and the said hydrolysate may also be obtained either from an animal or vegetable protein. The production of the aqueous extract may be effected either with or without the addition of an enzyme, or the protein—such as chopped-up meat—may first be subjected to at least one water extraction, in the absence of an enzyme, in order to obtain a water extract, and the residue from this step may then be subjected to about a quarter of an hour to a water extraction in the presence of a proteolytic enzyme in order to obtain an enzymatic extract. The meat or other protein residue from this second extraction may be subjected to a series of acid hydrolyses for the complete dissolution of the meat, or other protein, to obtain acid hydrolysates, the duration of each of these hydrolyses being so selected that the ratio by weight of the total nitrogen content to the amino nitrogen content of the hydrolysis product is smaller than ten and greater than one. Both extractions and the acid hydrolysate are mixed and subjected to evaporative drying, so that a water-soluble concentrate is obtained. The evaporative drying may also be carried out prior to the last-mentioned mixing.

In order that the invention may be clearly understood and readily carried into effect, a presently-preferred exemplary embodiment thereof will now be described in detail:

In the example, 1 kilo of chopped-up meat is heated for about one hour with two liters of water to about 90° C. The mixture is hereupon filtered and the meat residue treated once more in the same way. The two extracts are combined. They contain about 3% by weight meat extract, referred to fresh meat, and represent the classical meat extract.

The meat residue obtained after the above treatment is mixed with 800 milliliters of water and is heated to 40° C. after the pH value is adjusted to 7.5 by the addition of hydrochloric acid. 0.4 gram of a proteolytic enzyme, for example trypsin, which is dissolved in 50 milliliters of water is then added. After about a quarter of an hour the mixture is heated for about one hour to 90° C. in order to destroy the trypsin, and is then filtered. The enzymatic extract and a meat residue are thus obtained.

This meat residue is mixed with 800 milliliters of hydrochloric acid and heated for about 45 minutes to 100° C. Then it is filtered and the filtrate evaporated quickly to dryness. The same process is repeated with the meat residue from this first phase until the meat has completely dissolved. The products obtained from these successive processes are absorbed by 200 milliliters of water, decolorized by treatment three times with active carbon and adjusted by sodium hydroxide to pH 5. The acid hydrolysate is thus obtained.

The aqueous extract, the enzymatic extract and the acid hydrolysate are mixed, evaporated down to a content of 30% by weight soluble substances and dried by fine spraying atomization or by another method, so that a concentrate in powder form is obtained. In place of the drying step, the evaporation can be continued to a water content of 15% to 20% by weight, so that a liquid or paste-like concentrate is obtained.

As can be seen from the above example, the whole of the fresh meat is converted into a water-soluble concentrate. When it is dissolved in water, this concentrate gives a meat broth, which has the taste of a meat broth produced from fresh meat.

It has been found that by making use of a number of hydrolyses, whose duration is so selected that the ratio of the total nitrogen content to the amino nitrogen content of the hydrolysis products is smaller than ten and greater than one, thereby preventing a decomposition to the amino acid condition, an excellent quality taste is obtained.

Instead of with the trypsin, the enzymatic extraction can be carried out with an equivalent quantum of any other proteolytic enzyme of the exopeptidase type as well as of the endopeptidase type. Thus, for example, papain, pepsin, ficine, bromeline or rhozyme may be used. The same applies for the hydrolysis, for which any volatile mineral acid such as e.g. acetic acid, etc., may be used in the place of the hydrochloric acid.

The hydrolysis series can be carried out continuously. About every 45 minutes the solution may be filtered and the hydrochloric acid evaporated therefrom. The hydrochloric acid so withdrawn is constantly replaced by fresh hydrochloric acid. In this manner the hydrolysis remains uninterrupted, but controlled, and the result, required from the series of successive hydrolyses, that is the prevention of the decomposition of the already dissolved meat by a hydrolysis of too long duration, is achieved. A disadvantageous taste is thereby avoided.

In addition to the aforesaid known water-soluble meat extracts there are other known extracts, which are obtained by water extraction from protein-containing substances of vegetable origin, as for example from yeast, which taste like meat extract. With these also the small yields and high prices are disadvantageous.

In addition products are known, which are obtained by acid hydrolysis from protein-containing substances, of animal as well as vegetable origin. These products have the characteristic taste of protein hydrolysates, a taste, which is not very much liked and which causes a prejudice against such products.

The present invention eliminates these disadvantages. For example, a typical product according to the invention which is free from these disadvantages contains 10% to 25% by weight of a product, which is derived by a water extraction of at least one protein substance, and 75% to 80% by weight of a product, which is derived by acid hydrolysis of at least one protein substance. The product obtained by water extraction of at least one protein substance is mixed with the protein hydrolysate produced according to the aforesaid process, and the result is a soluble food, which comes very near the taste of meat broth. A mixture of, for example, 70 grams of dissolved meat extract, obtained by extraction of beef cut up in small pieces, with 280 grams of a product produced by hydrolysis of the meat residue obtained from the extraction, is decolorized with active carbon, adjusted to a pH value of 5.5 and dried by atomization. This gives 350 grams of a soluble food with the taste of meat broth.

In the preceding example beef is the protein-containing substance employed for the water extraction. Alternatively, however, any protein-containing substance of animal as well as vegetable origin can be used alone or together with other substances. Thus the extraction can be obtained from whale meat or yeast. The same applies for the acid hydrolysis. In the place of the hydrolysate of the beef residue, there can be used a hydrolysate obtained by the acid hydrolysis of whale meat, yeast, gluten, or soya bean residue.

A preferred product according to the present invention is obtained if the product of the hydrolysis of a protein-containing substance contains no humin substances. This is the case when the ratio between the total nitrogen content and the amino nitrogen content is smaller than ten and greater than one.

The portion comprising 10% to 25% by weight of the aforesaid food product may be obtained by the use of a proteolytic enzyme. If this enzyme involves the production of peptides, it is important that the produced peptides do not contain more than 10 amino acid molecules.

A further representative example of a product according to the invention may weight 350 grams, and consist of 35 grams aqueous extract, 35 grams of a product from enzymatic hydrolysis and 280 grams of a product from acid hydrolysis.

Having regard to their taste, the foods according to the invention can be used for soup, meat broths, vegetable preserves with the taste of meat, gravy, or as additions to pastries, bread and children's food, for the purpose of wholly or partially flavoring these.

Having regard to this chemical composition, that is the composition of amino acids, the foods described above have numerous dietetic uses. Their important amino acids are present approximately in the same proportion as in meat, but in an immediately assimilable form.

The foods described above or the soups and the like produced on the basis of these products can also be used in clinics as strengthening food for patients, who have had a serious operation or are otherwise greatly weakened. More especially the high proportion of lysine/tryptophane promoting the growth of children is important. It can also be used as food or a food component for old people.

The described food can however be used especially in all cases where it is a matter of having an "instant" product.

The invention is further concerned with the recovery of hydrochloric acid or another volatile mineral acid, from the acid hydrolysis process.

This may be effected by distillation with a carrier medium by which the hydrolysis solution is freed of acid down to a minimum content. The thus-recovered acid can be returned to the hydrolysis process.

In the selection of the carrier, which removes the acid from the albumen hydrolysate, care must be taken that the formation of foam is prevented. Gases or easily vaporizable liquids can be employed as carriers.

Having thus disclosed the invention, what is claimed is:

1. A method of producing a water-soluble food concentrate having the taste of meat broth, which comprises extracting a quantum of protein with water and thus producing an aqueous extract and a residue, subjecting a quantum of protein to acid hydrolysis while maintaining the ratio by weight between the total nitrogen content and the amino nitrogen content of the resultant acid hydrolysate at a magnitude smaller than 10 and greater than one, subjecting the aqueous extract and the hydrolysate to at least partial drying, and admixing the said extract and hydrolysate at any stage relative to said partial drying, thereby producing the desired water-soluble food concentrate.

2. A method according to claim 1, wherein the protein subjected to acid hydrolysis is different from the protein subjected to water extraction.

3. A method according to claim 1, wherein the protein subjected to acid hydrolysis is the residue from the said extraction with water.

4. A method according to claim 1, wherein the aqueous extract and the hydrolysate are at least partially dried before admixture thereof.

5. A method according to claim 1, wherein the aqueous extract and the hydrolysate are admixed and then subjected to at least partial drying.

6. A method according to claim 1, wherein the protein subjected to acid hydrolysis is preliminarily subjected to the action of a proteolytic enzyme thereby producing an aqueous enzymatic extract and a residue, and the latter then subjected to the acid hydrolysis.

7. A method according to claim 1, wherein the protein from which the water extract is obtained is beef.

8. A method according to claim 1, wherein the protein from which the water extract is obtained is whale meat.

9. A method according to claim 1, wherein the protein from which the water extract is obtained is yeast.

10. A method according to claim 1, wherein the acid hydrolysate is obtained from animal protein.

11. A method according to claim 1, wherein the acid hydrolysate is obtained from vegetable protein.

12. A process according to claim 11, wherein the vegetable protein is the residue of extracted yeast.

13. A process according to claim 11, wherein the vegetable protein is the residue of extracted soya beans.

14. A process according to claim 11, wherein the vegetable protein is the residue of extracted gluten.

15. A method according to claim 1, wherein the aqueous extract is initially obtained without the addition of an enzyme and in which the residue from this water extraction is subjected to water extraction in the presence of a proteolytic enzyme in order to obtain an enzymatic extract, the residue of this enzymatic extraction being subjected to the acid hydrolysis, and this enzymatic extract being added to the aqueous extract and to the hydrolysate prior to the drying, each hydrolysis being carried out while maintaining the ratio by weight between the total nitrogen content and the amino nitrogen content of the resultant hydrolysate at a magnitude smaller than 10 and greater than one.

16. A method according to claim 1, wherein the acid hydrolysis is applied to meat and is carried out in a series of stages leading to a complete dissolution of the meat, the proportion between the total nitrogen content and the amino nitrogen content of the hydrolysate being maintained smaller than ten and greater than one in each stage.

17. A method according to claim 1, wherein the protein subjected to acid hydrolysis is first subjected to enzymatic extraction with water containing a proteolytic enzyme at a pH value of about 7.5 and a temperature of about 40° C.

18. A method according to claim 17, wherein the proteolytic enzyme is exopeptidase.

19. A method according to claim 17, wherein the proteolytic enzyme is endopeptidase.

20. A method according to claim 17, wherein the enzyme is trypsin.

21. A method according to claim 17, wherein the enzyme is pepsin.

22. A method according to claim 17, wherein the enzyme is papain.

23. A method according to claim 17, wherein the enzyme is ficine.

24. A method according to claim 17, wherein the enzyme is bromelin.

25. A method according to claim 17, wherein the enzyme is rhozyme.

26. A water-soluble food concentrate with the taste of meat broth consisting essentially of 10% to 50% by weight of the aqueous extract of a protein substance, and of 75% to 90% by weight of the acid hydrolysate of a protein substance, the ratio by weight between the total nitrogen content and the amino nitrogen content of the acid hydrolysate being smaller than 10 and greater than one.

27. A concentrate as defined in claim 26, wherein the two proteinous substances are identical.

28. A concentrate as defined in claim 26, wherein the two proteinous substances are different.

29. A concentrate as defined in claim 26, wherein the first proteinous substance is beef, and wherein the second proteinous substance is the residual beef from which the beef extract is prepared.

30. A concentrate according to claim 26, wherein the proteinous substances comprise a mixture of proteins.

31. A food product containing a concentrate as defined in claim 26.

References Cited in the file of this patent

UNITED STATES PATENTS

| | | |
|---|---|---|
| 186,605 | Naumann | Jan. 23, 1877 |
| 223,038 | Gaunt | Dec. 30, 1879 |
| 554,269 | Hetherington | Feb. 11, 1896 |
| 1,165,924 | Watkins-Pitchford | Dec. 28, 1915 |